United States Patent [19]

Walters

[11] Patent Number: 5,044,582
[45] Date of Patent: Sep. 3, 1991

[54] CEILING FAN SUPPORT

[75] Inventor: Randall Walters, Douglas City, Calif.

[73] Assignee: Trade Source International, El Dorado Hills, Calif.

[21] Appl. No.: 489,695

[22] Filed: Mar. 7, 1990

[51] Int. Cl.$^5$ .............................................. H02G 3/08
[52] U.S. Cl. ...................................... 248/57; 248/343; 248/200.1; 248/546
[58] Field of Search ............... 248/343, 57, 200.1, 248/337, 546, 544

[56] References Cited

U.S. PATENT DOCUMENTS

| 867,555 | 10/1907 | Burton | 248/337 |
|---|---|---|---|
| 1,752,472 | 4/1930 | Whitney | 248/200.1 X |
| 2,670,919 | 3/1954 | Esoldi | 248/216 |
| 2,788,188 | 4/1957 | Smith et al. | 248/57 |
| 3,518,421 | 6/1970 | Cogdill | 248/57 |
| 4,463,923 | 8/1984 | Reiker | 248/546 |
| 4,909,405 | 3/1990 | Kerr, Jr. | 248/57 |

Primary Examiner—Alvin C. Chin-Shue
Attorney, Agent, or Firm—Poms, Smith, Lande & Rose

[57] ABSTRACT

A ceiling fan support for supporting a fan in a hole through a ceiling. The support is comprised of telescoping sections and is insertible through a hole in the ceiling and has teethed braces at each end adapted to be situated against a pair of spaced joists in the ceiling on each side of the hole. A tool is inserted into aligned holes in the telescoping sections and one of the telescoping sections is moved longitudinally until teeth on the braces dig into the joists thereby firmly supporting the support in the hole in the ceiling while a constant downward pressure is exerted on the telescoping sections maintaining them in fixed telescoped position.

14 Claims, 3 Drawing Sheets

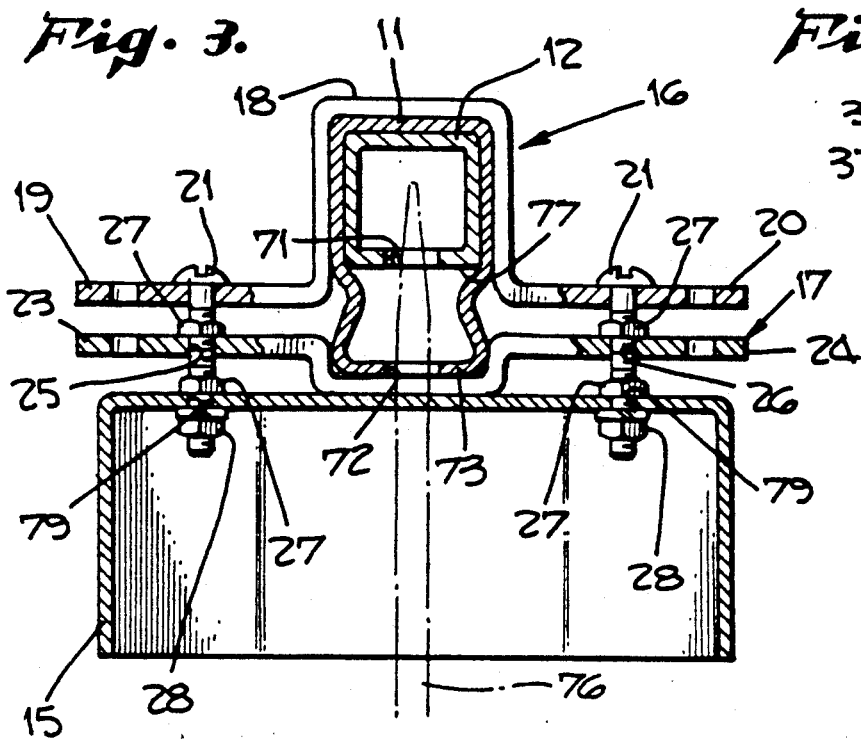
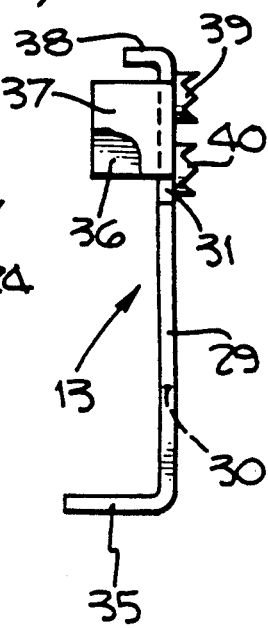
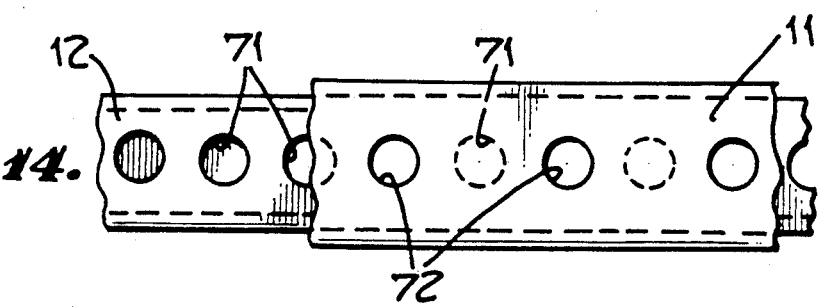
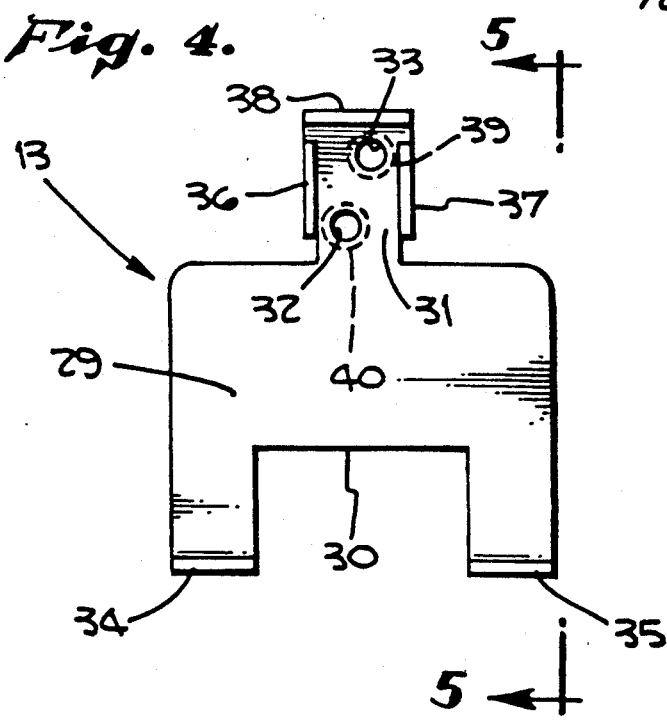
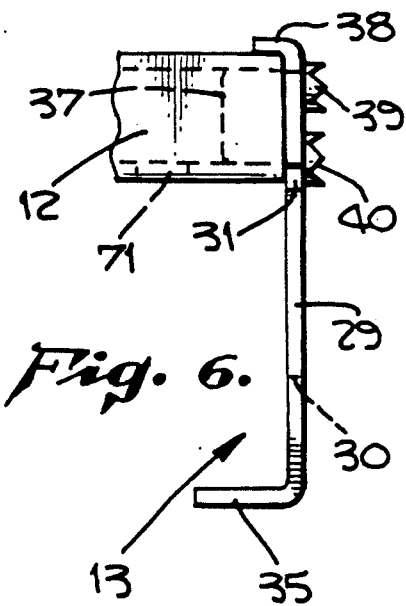

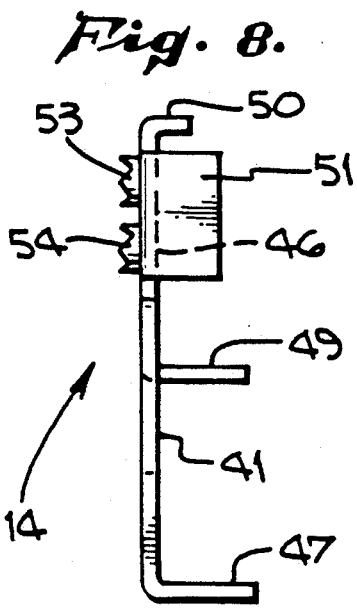
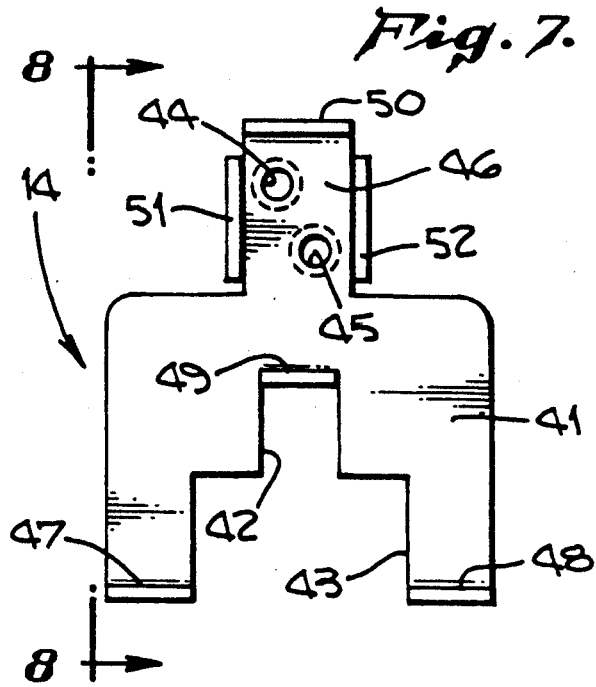
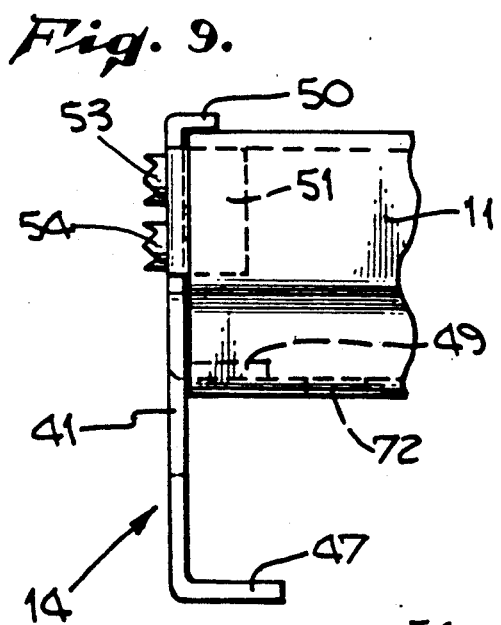
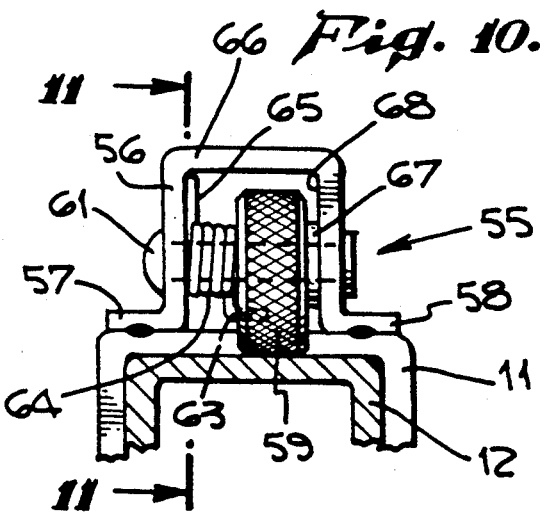
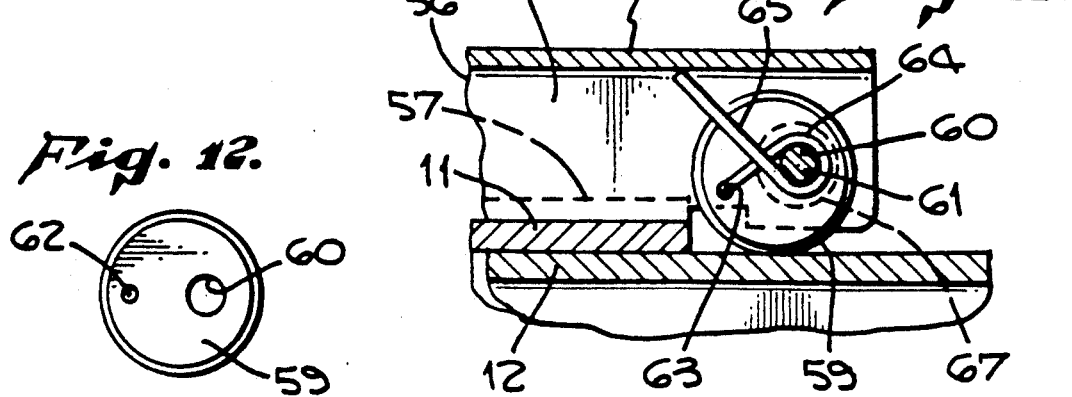

5,044,582

CEILING FAN SUPPORT

BACKGROUND OF THE INVENTION

1. Field of the Invention

The invention relates to a ceiling fan support; and, more particularly, to a fan support comprised of telescoping sections with teethed braces at each end adapted to dig into joists on each side of a hole in a ceiling in which the brace is installed.

2. Description of the Prior Art

Adjustable supports for supporting fixtures in a ceiling are well known in the art. For example, in U.S. Pat. No. 2,670,919 to Esoldi, an adjustable support for a ceiling light fixture is disclosed having a pair of nested channel members 2, 3 in slidable longitudinal adjustment. Esoldi uses a prying tool 13' (FIG. 4 and column 2, lines 38 et. seq.) which is insertible into one of the slots 6 in members 2, 3 to move one of the channel members with respect to the other in an opposite direction. However, the channel members might loosen up before the strap 10 is tightened in place. There is no way to hold the channel members 2, 3 together until the lighting fixture or other fixture is secured to the strap 10 (see phantom lines 16 in FIG. 2).

There is thus a need for a ceiling fan support which can be quickly and easily inserted into a hole in a ceiling and then supported between a pair of joists on each side of the hole. Such a support should be quickly and easily expanded into locking relationship to the joists while applying constant lateral pressure against the joists for permanent stability so as to support a fan or other fixture.

SUMMARY OF THE INVENTION

It is an object of this invention to provide a support for a fan or other fixture which is insertible into a ceiling hole and supported laterally against a pair of joists on each side of the hole.

It is a further object of this invention to provide such a support which exerts constant lateral pressure against the joists for permanent stability.

These and other objects are preferably accomplished by providing a ceiling fan support comprised of telescoping sections insertible through a hole in a ceiling. The support has teethed braces at each end adapted to be situated against a pair of spaced joists in the ceiling on each side of the hole. A tool is inserted into aligned holes in the telescoping sections and one of the telescoping sections is moved longitudinally until teeth on the braces dig into the joists thereby firmly supporting the support in the hole in the ceiling while a constant downward pressure is exerted on the telescoping sections maintaining them in fixed telescoped position.

BRIEF DESCRIPTION OF THE DRAWING

FIG. 3 is a cross-sectional view taken along lines 3—3 of FIG. 2, a tool 76 shown in phantom;

FIG. 4 is a front elevational view of clip 13 alone of the assembly of FIG. 1;

FIG. 5 is a view taken along lines 5—5 of FIG. 4;

FIG. 6 is a detailed view of a portion of the assembled parts of FIG. 2 showing one of the clips received in the inner tube;

FIG. 7 is a front elevational view of clip 14 alone of the assembly of FIG. 1;

FIG. 8 is a view taken along lines 8—8 of FIG. 7;

FIG. 9 is a detailed view of a portion of the assembled parts of FIG. 2 showing the other clip received in the outer tube;

FIG. 10 is an end view of a portion of tube 11 showing the roller assembly mounted thereon;

FIG. 11 is a view taken along lines 11—11 of FIG. 10;

FIG. 12 is an elevational view of the roller alone of FIGS. 10 and 11;

FIG. 14 is a view taken along lines 14—14 of FIG. 13, the tool being removed therefrom.

DESCRIPTION OF THE PREFERRED EMBODIMENT

Figure 1:
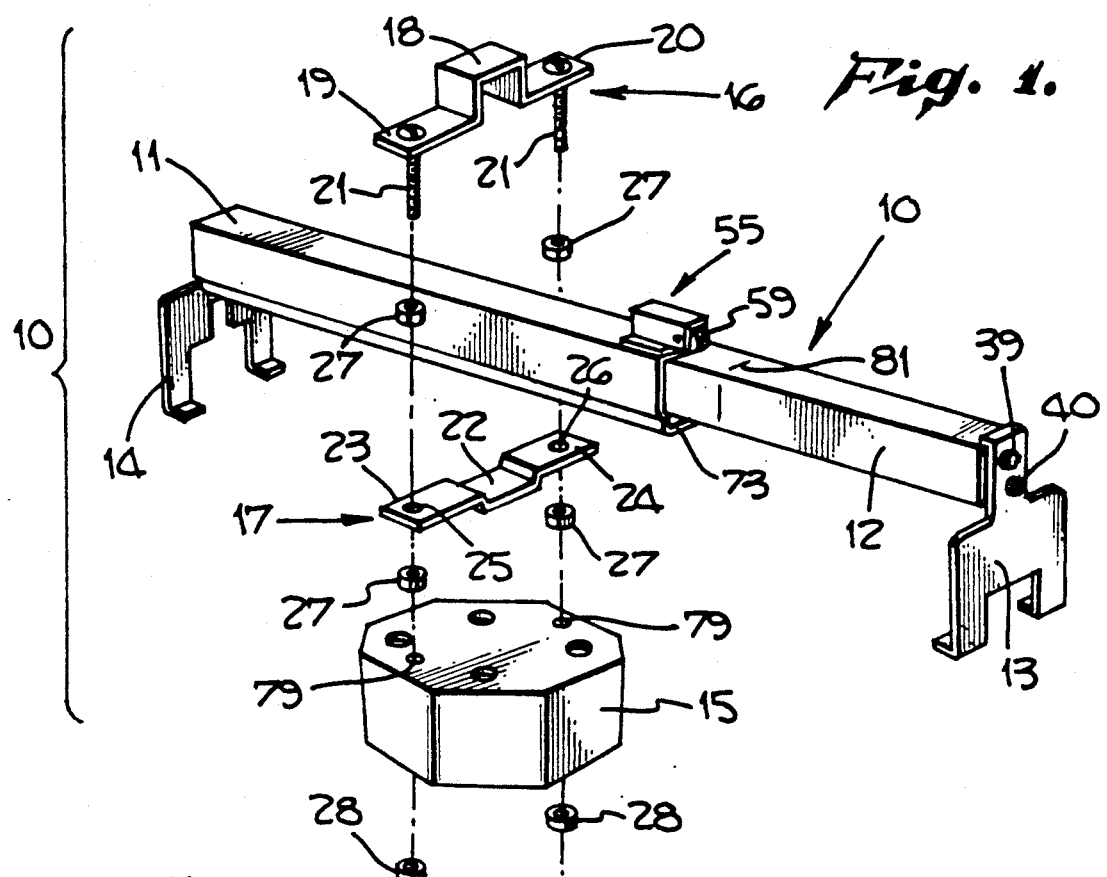
FIG. 1 is an exploded view of the ceiling fan support in accordance with the teachings of the invention.

Referring now to FIG. 1 of the drawing, a ceiling fan support assembly 10 in accordance with the teachings of the invention is shown in exploded view. Assembly 10 includes an outer tube 11 and a telescoping inner tube 12. A first end clip 13 is provided adapted to be secured to the inner tube 12 and a second end clip 14 is provided adapted to be secured to the outer tube 11. A conventional electrical box 15 is provided adapted to be secured to tubes 11, 12, when assembled by a first upper bracket 16 secured to a lower bracket 17. Bracket 16 has a generally U-shaped midportion 18 with a pair of integral laterally extending apertured flange portions 19, 20 adapted to receive stove bolts 21 therethrough. Bracket 17 also has a generally U-shaped midportion 22 (but of an overall height less than the overall height of midportion 18) with a pair of integral laterally extending aperture flange portions 23, 24, as apertures 25, 26, respectively, for receiving bolts 21 therethrough.

Figure 2:
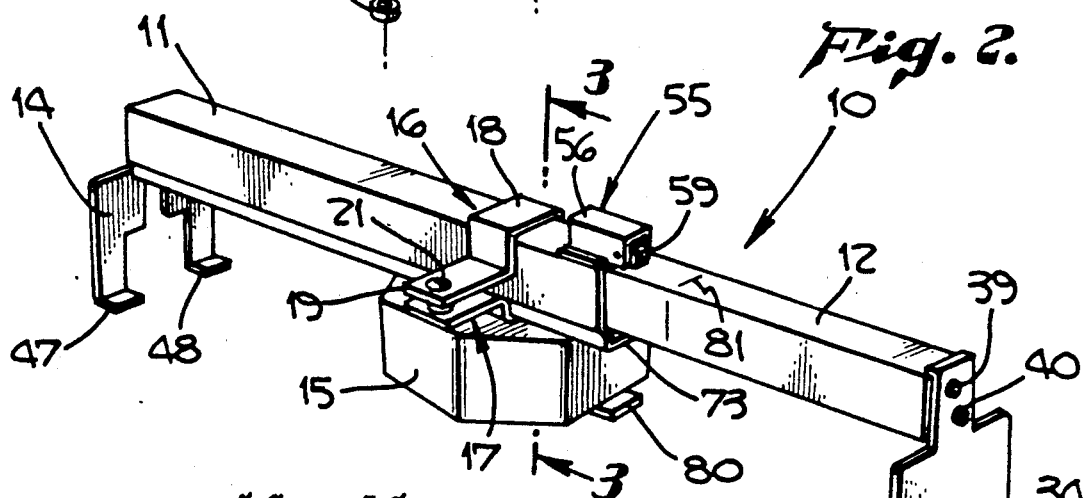
FIG. 2 is an assembled view of the fan support of FIG. 1.

As seen in FIG. 2, the midportion 18 of bracket 16 is adapted to straddle the upper end of outer tube 11 whereas the midportion 22 of bracket 17 is adapted to straddle the lower end of outer tube 11 (see also FIG. 3). Also as seen in FIGS. 1 and 3, lock washer nuts 27 are provided between flange portions 19, 23 and 20, 24, receiving bolts 21 therethrough, and between flange portions 23, 24 and the upper surface of box 15. A pair of lock nuts 28 are provided, threadably receiving bolts 21 therein, to secure box 15 to bracket 17. Although only one aperture and one bolt 21 is disclosed in each flange portion of brackets 16, 17, obviously more than one may be provided. As seen in FIGS. 4 and 5, clip 13 has a generally flat rectangular main body portion 29 with a generally rectangular cut-out area 30 and an upper extension portion 31. A pair of spaced holes 32, 33 are provided through extension portion 31. The lower end of body portion 29 terminates in a pair of outwardly extending flanges 34, 35 on each side of area 30. A pair of outwardly extending flanges 36, 37 are also provided on each side of extension portion 31 with an outwardly extending flange 38 (shorter than flanges 36, 37) provided at the upper end of extension portion 31. Also, as seen in FIG. 5, a pair of spaced sharped teeth portions 39, 40 (extending rearwardly from holes 32, 33, respectively) are provided on the back side of extension portion 31 for reasons to be discussed. That is, portions 39, 40 are preferably formed by punching holes 32, 33 out of extension portion 31. As seen in FIG. 6, the spacing between flanges 36, 37 is such that the flanges 36, 37 are receivable in the open end of inner tube 12 with flange 38 disposed over the top thereof.

As seen in FIGS. 7 and 8, clip 14 has a generally flat rectangular main body portion 41 with a first upper generally rectangular cut-out area 42 and a second lower generally rectangular cut-out area 43, the latter greater in size than the former. A pair of spaced holes 44, 45 are provided through upper extension portion 46. The lower end of body portion 41 terminates in a pair of outwardly extending flanges 47, 48 on each side of cut-out area 43 with an outwardly extending flange 49 also provided at the upper end of cut-out area 42. Another outwardly extending flange 50 is provided at the upper end of extension portion 46 and is shorter in length than a pair of outwardly extending flanges 51, 52 on each side of extension portion 46. As seen in FIG. 8, a pair of sharp protrusion portions 53, 54 are provided on the back of extension portion 46 aligned with spaced holes 44, 45. That is, portion 53, 54 are preferably provided by punching holes 44, 45 out of portion 46. As seen in FIG. 9, when assembled to outer tube 11, the flanges 51, 52 and 49 are receivable inside of tube 11 with flange 50 resting on the outside upper surface thereof.

Figure 13:
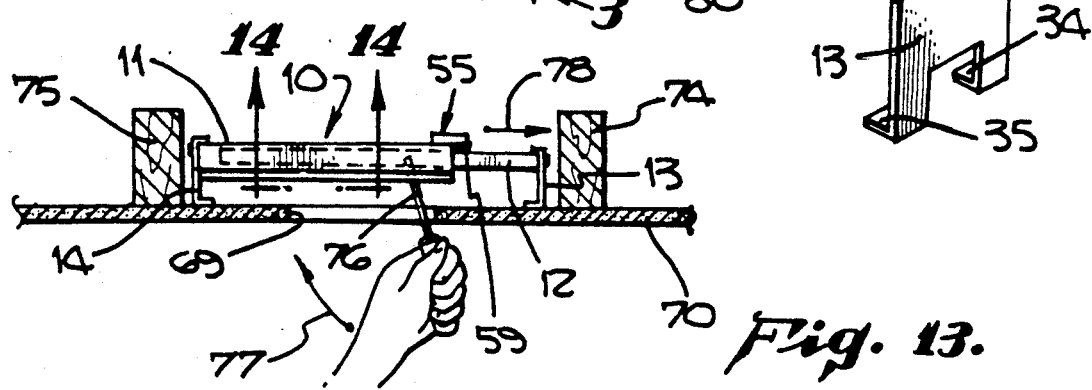
FIG. 13 is a cross-sectional view of a pair of spaced ceiling joists on each side of a hole through which the assembly of FIGS. 1 to 12 is installed.

As particularly contemplated in the present invention, a roller assembly 55 is provided on the upper surface of outer tube 11 for releasably locking the telescoping tubes 10 and 11 into a firm fixed position. Thus, as seen in FIGS. 9 and 10, roller assembly 55 includes a main U-shaped housing 56 having a pair of outwardly extending flanges 57, 58 welded or otherwise secured to the upper surface of outer tube 11. A round knurled roller 59 is provided mounted within housing 56. Roller 59, as seen in FIG. 12, has an offset hole 60 therethrough of a diameter sufficient to receive therein a pin 61 (FIGS. 10 and 11). Roller 59 rotates about pin 61 and pin 61 may be riveted or otherwise secured to the housing 56. As seen in FIGS. 2 and 13, housing 56 extends beyond tube 11 so that roller 59 overlies the upper surface of tube 12. As seen in FIG. 12, roller 59 also has a smaller diameter hole 62 for receiving one end 63 (dotted lines in FIG. 10) of a coiled spring 64 therein. The coiled portion of spring 64 thus coils about pin 61 with the terminal end 65 abutting against the inner upper wall 66 of housing 56 as seen in FIG. 11. A spacer or washer 67 (FIG. 10) is provided between roller 59 and the inner side wall 68 of housing 56. Also, as seen in FIGS. 3 and 14, a plurality of spaced holes 72 extend along the bottom wall 73 of outer tube 11. A like plurality of spaced holes 71 (FIGS. 3 and 14) extend along the bottom wall 77 of inner tube 11.

In assembling brace assembly 10 to a suitable hole in the ceiling, such as hole 69 in FIG. 13 through ceiling 70, the assembly 10 is inserted through hole 69 with parts 11 to 14 assembled as in FIG. 2 and as heretofore discussed. It is to be understood that inner tube 12 can be cut to any desired length depending on the spacing between joists 74, 75. Also, roller 59 is easily lifted against its spring bias to insert inner tube 12 on the outer tube 11 with roller 59 riding top wall of inner tube 12.

The assembled parts are inserted into ceiling hole 69, the end of inner tube 12 first, with clip 13 disposed against joist 74 and then with clip 13 disposed against joist 75. A tool, such as screwdriver 76, is inserted into one of the holes 72 in the bottom wall 73 of outer tube 11. Tool 76 is inserted first through one of the holes 72 in outer tube 11, then at an angle through one of the holes 71 in inner tube 12 (see also FIG. 13). The tool 76 is moved toward clip 14, as indicated by arrow 77, to thereby move inner tube 12 in the direction of arrow 78. This process is repeated by removing tool 76, reinserting it and repeated while centering apparatus 10 over hole 69 until teeth 39, 40 on clip 13 and teeth 53, 54, on clip 14, are embedded into joists 74, 75, respectively. This secures the assembly 10 between joists 74, 75 with spring biased roller 59 bearing down on the upper surface of inner tube 12 thereby creating constant lateral pressure on the assembly 10 providing for permanent stability. No other clips or straps or the like are necessary. The spacing between holes 71 (FIG. 14) in tube 12 may be about ½ inch center to center; the spacing between holes 72 may be about 1¼ inches center to center. Bolts 21 and nuts 27 are now assembled to upper bracket 16 and bracket 16 is mounted to outer tube 11 as previously discussed. The lower bracket 17 is now mounted onto bolts 21 and secured, via nuts 27, to the bottom of tube 11 also as previously discussed. The assembly 10 should be maintained properly centered at all times and any electrical wiring is inserted through suitable openings in box 15. The box 15 is now mounted to the lower ends of bolts 21, utilizing suitable spaced holes 79 therein (FIG. 1) also as previously discussed, and nuts 28 are secured to bolts 21 to hold box 15 to assembly 10. Of course, any desired fixture, such as a fan, may be assembled to box 15 at this time by securing the flange 80 (FIG. 2) of such fixture to box 15, as is well known in the art.

It can thus be seen that a ceiling fan brace assembly is disclosed which can be quickly and easily installed in a ceiling hole and has the required strength to hang a fan, chandelier, plant, etc. It is quickly and easily expanded into a fixed, secured position between joists on each side of the ceiling hole. Any homeowner can install the assembly disclosed herein utilizing the simplest tools. The clips 13, 14 may be merely hammered into the ends of tubes 11, 12 and tube 12 is merely slid into tube 11 with the roller 59 held against its spring bias. A simple hacksaw can be used to cut tube 12 to its desired length. For example, joists are normally 16 or 24 inches apart. If the joists are 16 inches apart, tube 12 can be cut at indicia line 81 (FIG. 2) before assembly to tube 11 to provide the desired length. A conventional screwdriver, such as a phillips screwdriver, can be used to telescope tubes 11, 12 into position. The knurled surface of roller 59, along with its spring bias, serves to retain the tubes 11, 12 in fixed position. The homeowner need not go into the attic or the like to install apparatus 10.

Tubes 11, 12 may be rectangular in cross-section or any suitable irregular configuration and any suitable materials, such as steel, aluminum, etc. may be used. Box 15 is a conventional electrical box and may have suitable knockouts for providing holes for electrical conduits as is well known in the art. Although a ceiling fan has been disclosed, obviously, any suitable fixture may be mounted to assembly 10 and the scope of the invention is to be limited only by the appended claims.

I claim:

1. A brace assembly for a ceiling fixture or the like adapted to be mounted through a hole in a ceiling and above said ceiling having a pair of spaced joists on each side of said hole comprising:

a first hollow elongated member telescopingly received in a second hollow telescoping member, each of said members having a top wall, a bottom wall and interconnecting side walls with a plurality of spaced apertures extending through each of said bottom walls;

a first clip receivably mounted in the end of said second member opposite the end therethrough receiving said first member therein, said first clip having teeth means extending in a direction away from said second member adapted to dig into one of said joists when moved into engagement therewith;

a second clip receivably mounted in the end of said first member opposite the end thereof received in said second member, said second clip having teeth means extending in a direction away from said first member adapted to dig into the other of said joists when moved into engagement therewith; and biasing means mounted on said second member engaging said first member under bias of a spring bearing only downwardly constantly and continuously against said first member at all times when said first member is moved in a telescoping relationship with respect to said second member thereby retaining said first member in fixed telescoping relationship to said second member at all times during telescoping movement of said first and second members.

2. In the assembly of claim 1 wherein said means includes a biasing roller housing mounted on the upper surface of said second member having a rotatably mounted roller therein, said spring engaging said roller and urging said roller downwardly against the upper surface of said first member.

3. In the assembly of claim 2 wherein said housing has an inner wall and extends beyond said second member with said roller being rotatably mounted on a cross pin in said housing, said roller being mounted on said pin offset from its center thereof, and said spring being fixed at one end to said roller coiled about said pin with its other end bearing against the inner wall of said housing.

4. In the assembly of claim 2 or 3 wherein said roller is knurled on the exterior surface thereof, said exterior surface bearing against said first member.

5. In the assembly of claim 1 including indicia means on said first member for indicating the location thereon for cutting said first member depending upon the spacing between the joists against which the assembly is to be installed.

6. In the assembly of claim 1 wherein each of said clips includes a first portion telescopingly received in said respective member and support flanges at the bottom thereof for supporting each of said clips against said ceiling on each side of an opening therethrough.

7. In the assembly of claim 6 wherein each of said teeth means includes sharp teeth adapted to dig into said joists.

8. In the assembly of claim 7 wherein said teeth are punched out of said clips.

9. In the assembly of claim 1 including a first bracket adapted to overlie said second, member, a second bracket adapted to underlie said second member, and releasable securing means for securing said first bracket to said second bracket.

10. A support assembly comprising:

a first hollow elongated member having a plurality of spaced holes along the bottom surface thereof telescopingly receivable in a second hollow elongated member also having a plurality of spaced holes along the bottom surface thereof;

a first clip having a telescoping portion receivable in one end of said first member with support legs at the bottom thereof and sharp protrusions extending away from said first member;

a second clip having a telescoping portion receivable in one end of said second member with support legs at the bottom thereof and sharp protrusions extending away from said second member;

a generally U-shaped housing having an inner wall mounted on the upper surface of said second member at the end thereof receiving said second member therein, said housing extending beyond said last-mentioned end and overlying said first member, a generally round roller having a roughened outer periphery bearing against the upper surface of said first member, said roller being mounted for rotation in said housing by a pin extending through said housing and said roller, said pin extending through a hole in said roller offset from the center thereof so that said roller extends outside of said housing, said roller rotating about said pin, and a spring coiled about said pin between said roller and the inner wall of said housing having one end fixed to said roller and the other end bearing against the inner wall of said housing thereby biasing said roller against the upper surface of said first member.

11. In the assembly of claim 10 including a spacer encircling said pin between said roller and the inner wall of said housing.

12. In the assembly of claim 10 wherein said one end of said spring is mounted in a hole in said roller.

13. A brace assembly for a ceiling fixture or the like adapted to be mounted through a hole in a ceiling having a pair of spaced joists on each side of said hole comprising:

a first hollow elongated member telescopingly received in a second hollow telescoping member, each of said members having a top wall, a bottom wall and interconnecting side walls with a plurality of spaced apertures extending through each of said bottom walls;

a first clip receivably mounted in the end of said second member opposite the end therethrough receiving said first member therein, said first clip having teeth means extending in a direction away from said second member adapted to dig into one of said joists when moved into engagement therewith;

a second clip receivably mounted in the end of said first member opposite the end thereof received in said second member, said second clip having teeth means extending in a direction away from said first member adapted to dig into the other of said joists when moved into engagement therewith;

biasing means mounted on said second member engaging said first member to bear against the same and retain said first member in fixed telescoping relationship to said second member, said biasing means including a roller housing mounted on the upper surface of second member having a rotatably mounted spring biased roller therein bearing against the upper surface of said first member; and said housing having an inner wall and said housing extending beyond said second member with said roller being rotatably mounted on a cross pin in said housing, said roller being mounted on said pin offset from its center thereof, and a spring fixed at one end to said roller coiled about said pin with its other end bearing against the inner wall of said housing.

14. In the assembly of claim 13 wherein said roller is knurled on the exterior surface thereof, sand exterior surface bearing against said first member.

* * * * *